United States Patent
Jiang et al.

(10) Patent No.: US 11,687,326 B2
(45) Date of Patent: Jun. 27, 2023

(54) METHOD AND APPARATUS FOR DATA INTERACTION

(71) Applicant: ALIBABA GROUP HOLDING LIMITED, Grand Cayman (KY)

(72) Inventors: Long Jiang, Hangzhou (CN); Jianyi Meng, Hangzhou (CN); Chunqiang Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 118 days.

(21) Appl. No.: 17/102,742

(22) Filed: Nov. 24, 2020

(65) Prior Publication Data

US 2021/0157555 A1   May 27, 2021

(30) Foreign Application Priority Data

Nov. 25, 2019  (CN) .......................... 201911166530.2

(51) Int. Cl.
  *G06F 8/38*    (2018.01)
  *H04L 67/02*   (2022.01)
  *G06F 16/951*  (2019.01)
  *G06F 9/54*    (2006.01)

(52) U.S. Cl.
  CPC ............... *G06F 8/38* (2013.01); *G06F 9/547* (2013.01); *G06F 16/951* (2019.01); *H04L 67/02* (2013.01)

(58) Field of Classification Search
  CPC .......... G06F 8/38; G06F 16/951; G06F 9/547; G06F 9/449; G06F 9/45512; G06F 9/45529; H04L 67/02
  See application file for complete search history.

(56) References Cited

U.S. PATENT DOCUMENTS

| | | | |
|---|---|---|---|
| 7,213,227 B2 | 5/2007 | Kompalli et al. |
| 7,284,233 B2 | 10/2007 | Sengodan |
| 7,286,999 B2 | 10/2007 | Majd et al. |
| 7,359,990 B2 | 4/2008 | Munir et al. |
| 7,395,312 B2 | 7/2008 | Kothari et al. |
| 7,480,916 B2 | 1/2009 | Beisiegel et al. |
| 7,676,785 B2 | 3/2010 | Loksh et al. |
| 7,716,640 B2 | 5/2010 | Pik et al. |
| 8,296,720 B2 | 10/2012 | Coulthard et al. |
| 8,645,905 B2 | 2/2014 | Halbedel |

(Continued)

OTHER PUBLICATIONS

Written Opinion and International Search Report for PCT Application No. PCT/US2020/061942 dated Feb. 11, 2021.

*Primary Examiner* — Angie Badawi (57) ABSTRACT

This application discloses a data interaction method, for implementing data interaction between a web page module and a functional module of an application. The web page module includes at least one interaction API. The method includes: receiving an interaction request from a target interaction API in the web page module, where the interaction request includes an identifier of a target functional module with which the web page module requests to interact; determining, according to a preset corresponding relationship between interaction APIs and parsing modules, a target parsing module corresponding to the target interaction API; and sending the identifier of the target functional module to the target parsing module, for the target parsing module to call the target functional module to implement a corresponding function.

11 Claims, 7 Drawing Sheets

(56) References Cited

U.S. PATENT DOCUMENTS

| | | |
|---|---|---|
| 8,793,653 B2 | 7/2014 | Balasubramanian et al. |
| 8,826,239 B2 | 9/2014 | Sawano |
| 8,850,383 B2 | 9/2014 | Adams et al. |
| 9,557,970 B2 | 1/2017 | Meigen et al. |
| 9,575,748 B2 | 2/2017 | Mohammed et al. |
| 2005/0005198 A1* | 1/2005 | Vakrat ................. G06F 11/2294 714/37 |
| 2009/0132998 A1* | 5/2009 | Meijer ................. G06F 11/3656 717/124 |
| 2009/0327860 A1* | 12/2009 | Georgiev ............ G06F 16/9558 715/234 |
| 2010/0050173 A1 | 2/2010 | Hensbergen |
| 2011/0161349 A1* | 6/2011 | Ireland .................... G06F 16/27 707/769 |
| 2015/0106078 A1* | 4/2015 | Chang .................... G06F 16/35 704/9 |
| 2015/0262544 A1* | 9/2015 | Asakimori .......... G06F 16/9577 345/520 |
| 2017/0161253 A1* | 6/2017 | Silver ................. H04L 67/2804 |
| 2017/0371937 A1 | 12/2017 | Shah et al. |
| 2018/0321993 A1 | 11/2018 | Mcclory et al. |
| 2019/0179620 A1* | 6/2019 | Lowery ............... G06F 11/0709 |
| 2019/0251144 A1* | 8/2019 | Duan .................... G06F 40/134 |
| 2021/0081260 A1* | 3/2021 | Gilling ................ G06F 9/30021 |
| 2022/0032192 A1* | 2/2022 | Xu ........................ A63F 13/533 |

* cited by examiner

METHOD AND APPARATUS FOR DATA INTERACTION

CROSS-REFERENCE TO RELATED APPLICATION

This application is based on and claims priority to and benefit of Chinese Patent Application No. 201911166530.2, filed with the China National Intellectual Property Administration on Nov. 25, 2019. The entire content of the above-identified application is incorporated herein by reference in its entirety.

TECHNICAL FIELD

This application relates to the field of communication technologies in a software application, and in particular, to a method and an apparatus for data interaction between a web page module and a functional module of a software application.

BACKGROUND

Software applications are generally written in C/C++ or other system programming languages. A software application includes a plurality of functional modules for implementing different functions. To achieve a better interface display effect, reduce the development costs, and reuse network resources, a browser plug-in may be integrated in the software application to embed web pages in the software application for front-end graphical display. Generally, web pages embedded in a software application are dynamic web pages including JavaScript (JS) code.

Figure 1:
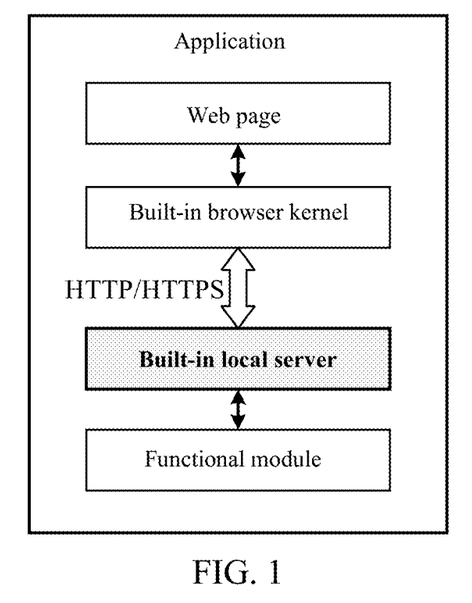
FIG. 1 is a schematic diagram illustrating a process of interaction between a web page module and a functional module in a software application, according to existing technologies.

In some cases, a web page module embedded in the software application needs to perform data interaction with a functional module of the software application. For example, a user input is received through a web page, and the corresponding functional module is called based on the user input to implement a certain function. A current mainstream interaction method is shown in FIG. 1. In this method, a local server is set up in the software application. When a front-end web page needs to interact with a functional module of the software application, a built-in browser kernel sends a network request to the local server through the HTTP/HTTPS protocol. The local server calls the corresponding functional module based on the request from the front end to complete a data interaction. This method adopts a network communication method to perform data interaction between internal modules of the software application, leading to inefficient communication and a waste of network resources. In addition, this method requires setting up a local server in the software application, which increases the amount and complexity of code and is inefficient for the development and maintenance of the software application.

SUMMARY

This application provides a data interaction method and system to resolve or at least alleviate the above problems.

According to a first aspect of this application, a data interaction method is provided, for implementing data interaction between a web page module and a functional module of a software application. The web page module includes at least one interaction component. The at least one interaction component may refer to an application programming interface (API) defined in the web page module that, when called, sends out an interaction request for interacting with a functional model of the software application. The method includes: receiving an interaction request from a target interaction API in the web page module. The interaction request includes an identifier of a target functional module with which the web page module requests to interact. The method further includes: determining, according to a preset corresponding relationship between interaction APIs and parsing modules, a target parsing module corresponding to the target interaction API; and sending the identifier of the target functional module to the target parsing module, for the target parsing module to call the target functional module to implement a corresponding function.

In some embodiments, the web page module is configured to receive a trigger event that triggers the target interaction API to send the interaction request.

In some embodiments, before the determining a target parsing module corresponding to the target interaction API, the method further includes: determining whether the interaction request is a general request that does not need to interact with a functional module of the software application; and if the interaction request is not the general request, performing the determining a target parsing module.

In some embodiments, the determining whether the interaction request is a general request includes: determining whether an API name of the target interaction API belongs to a set of general API names.

In some embodiments, the interaction request further includes an input parameter of the target functional module, and the method further includes: sending the input parameter of the target functional module to the target parsing module, causing the target parsing module to call the target functional module with the input parameter to implement the corresponding function.

In some embodiments, after calling the target functional module to implement a corresponding function, the method further includes: receiving an execution result returned by the target functional module.

In some embodiments, the interaction request further includes a success callback function and a failure callback function, and after receiving an execution result returned by the target functional module, the method further comprises: calling the success callback function if the execution result is successful; and calling the failure callback function if the execution result is failed.

In some embodiments, the interaction API is written in JavaScript (JS), and the parsing module and the functional module are written in C/C++.

In some embodiments, the software application is an integrated development environment (IDE).

According to another aspect of this application, a system for implementing data interaction is provided. The system includes one or more processors and one or more non-transitory computer-readable memories coupled to the one or more processors, the one or more non-transitory computer-readable memories storing instructions that, when executed by the one or more processors, cause the system to perform operations including: receiving an interaction request from a target interaction API in the web page module. The interaction request includes an identifier of a target functional module with which the web page module requests to interact. The operations further include: determining, according to a preset corresponding relationship between interaction APIs and parsing modules, a target parsing module corresponding to the target interaction API; and sending the identifier of the target functional module to the target parsing module, for the target parsing module to call the target functional module to implement a corresponding function.

According to yet another aspect of this application, a non-transitory computer-readable storage medium for implementing data interaction is provided. The non-transitory computer-readable storage medium stores instructions that, when executed by one or more processors, cause the one or more processors to perform operations including: receiving an interaction request from a target interaction API in the web page module. The interaction request includes an identifier of a target functional module with which the web page module requests to interact. The operations further include: determining, according to a preset corresponding relationship between interaction APIs and parsing modules, a target parsing module corresponding to the target interaction API; and sending the identifier of the target functional module to the target parsing module, for the target parsing module to call the target functional module to implement a corresponding function.

According to the technical solutions of this application, an interaction component (may also be called an interaction API) for sending an interaction request and a parsing module for parsing the interaction request are predefined and are bound in correspondence. The parsing module is configured to parse the interaction request sent by the corresponding interaction API, determine a functional module that the interaction request requests to call, and call the functional module. When a target interaction API in a web page module sends an interaction request, a target parsing module corresponding to the target interaction API is determined according to a preset corresponding relationship between interaction APIs and parsing modules. The target parsing module parses an identifier of a target functional module in the interaction request, and calls the target functional module to implement a corresponding function.

In the technical solutions of this application, data interaction between a web page module and a functional module in a software application is achieved by using a parsing module. Compared with an interaction method that requires setting up a local server to perform network communication in existing technologies, the interaction method of this software application has higher communication efficiency, avoids a waste of network resources, requires a smaller amount of code, and facilitates the development and maintenance of software applications.

The foregoing is merely a general description of the technical solutions of this application. In order to provide a clearer understanding of the technical means of this application so that this application can be implemented according to the contents of the specification, and make the above and other objectives, features, and advantages of this application more obvious and comprehensible, a detailed description of this application is given below.

BRIEF DESCRIPTION OF THE DRAWINGS

To achieve the above and related objectives, some illustrative aspects are described herein with reference to the following description and the accompanying drawings. These aspects indicate various manners in which the principles disclosed herein can be practiced, and all the aspects and equivalent aspects thereof are intended to fall within the scope of the claimed subject matter. The above and other objectives, features, and advantages of this application will become more obvious by reading the following detailed description with reference to the accompanying drawings. The same reference numerals generally represent the same components or elements throughout this application.

DETAILED DESCRIPTION

Exemplary embodiments of this application will be described below in further detail with reference to the accompanying drawings. Although the exemplary embodiments of this application are shown in the accompanying drawings, it should be understood that this application can be implemented in various forms and should not be limited to the embodiments set forth herein. Instead, the embodiments are described for the purpose of providing a more thorough understanding of this application and fully conveying the scope of this application to those skilled in the art.

In some embodiments, in order to achieve efficient interaction between a web page module and a functional module in a software application, a data interaction apparatus may be implemented within the software application and configured to perform data interaction methods described in this description.

Figure 2:
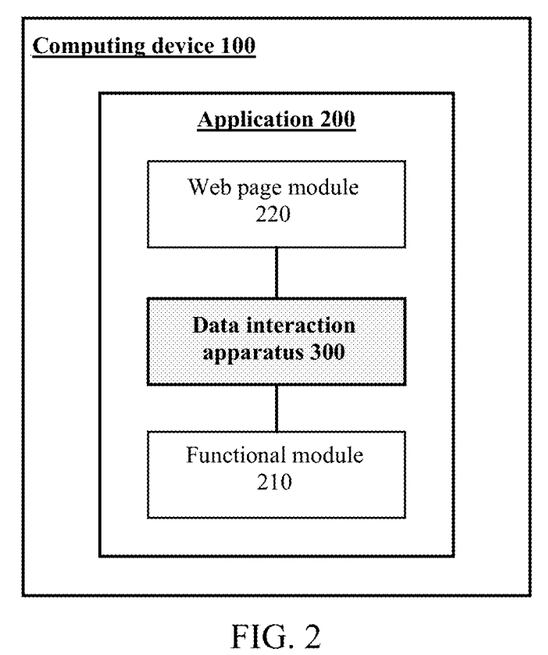
FIG. 2 is a schematic diagram of a computing device 100, in some embodiments of this application.

Software applications can be installed in computing devices. FIG. 2 is a schematic diagram of such a computing device 100. The computing device 100 may be any device with storage, computing, and display capabilities. For example, the computing device may be a personal computer (PC) such as a desktop computer or a notebook computer; may be a mobile terminal such as a mobile phone, a tablet computer, a multimedia device, or a wearable device; or may be a smart device applied to home, industry, and other fields, such as a smart speaker, a smart air conditioner, a smart access control device, an industrial control device, a sensing device, or an Internet of Things (IoT) device equipped with a display panel, but is not limited thereto.

The software application 200 may be any software application, such as a shopping application, an instant messaging application, or a text editing application. The specific type of the software application 200 is not limited in this application. The software application 200 is stored in a memory (which is not shown in FIG. 2) of the computing device 100. A processor (which is not shown in FIG. 2) of the computing device 100 can read program instructions of the software application 200 from the memory and execute the program instructions, to implement corresponding functions of the software application.

In some embodiments, the software application 200 may be an integrated development environment (IDE) for software development and debugging of an embedded chip. When the software application 200 is implemented as an IDE, the computing device 100 is generally implemented as a personal computer such as a desktop computer or a notebook computer. In practice, a computing device for software development and debugging of an embedded chip is generally referred to as a "host."

Figure 3:
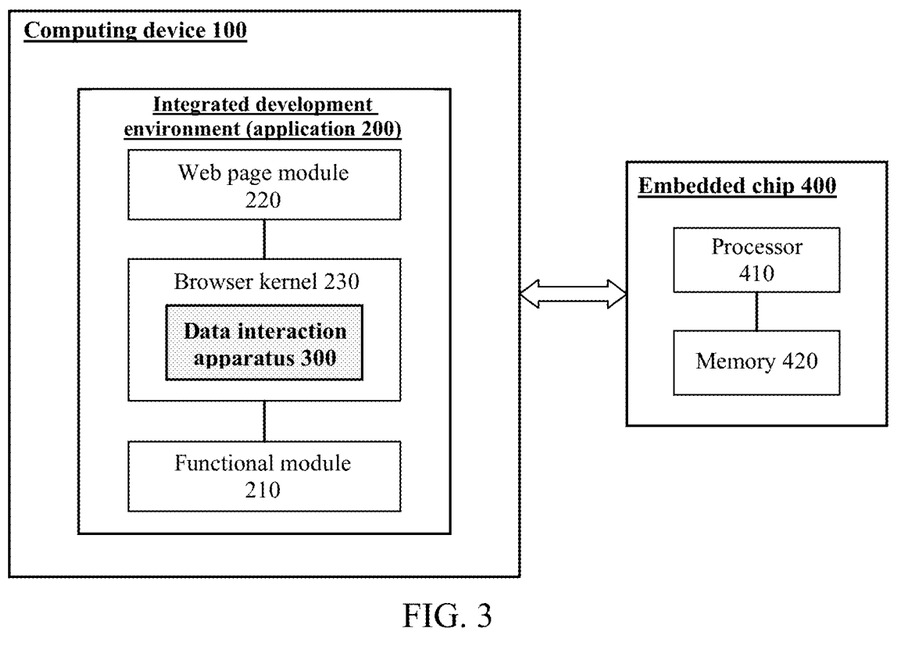
FIG. 3 is a schematic diagram of a computing device 100 when a software application 200 is an integrated development environment.

FIG. 3 is a schematic diagram of the computing device 100 when the software application 200 is implemented as an IDE. As shown in FIG. 3, the computing device 100 is connected to an embedded chip 400. The embedded chip 400 includes a processor 410 and a memory 420.

The processor 410 may be any integrated circuit with computing and control capabilities. The processor 410 is generally implemented as a single-core or multi-core central processing unit (CPU). In some embodiments, the processor 410 may also be a processor configured to process a particular computing task, such as a graphics processing unit (GPU), a neural network processing unit (NPU), or a tensor processing unit (TPU). The type of the processor 410 of the embedded chip 400 is not limited in this application.

The memory 420 may be configured to store program instructions for execution by the processor 410 and data required for executing the program instructions. The memory 420 includes, for example, a read-only memory (ROM), a random access memory (RAM), a synchronous dynamic random access memory (SDRAM), and the like, but is not limited thereto.

In some embodiments, the computing device 100 may be connected to the embedded chip 400 through a debugger (which is not shown in FIG. 3). The debugger may be, for example, a JTAG debugger, but is not limited thereto.

In some embodiments, a user may start the IDE in the computing device 100, and perform corresponding operations in the IDE to write a program for execution in the processor 410 of the embedded chip, compile and link the program to generate an executable file, and send, through the debugger, the executable file to the memory 420 of the embedded chip 400 for storage, for the processor 410 to run the program according to the executable file and perform debugging. The user may control the process of debugging the processor 410 by performing operations in the IDE, for example, but not limited to, starting, suspending, or ending the running of the program, setting a program breakpoint, setting single stepping, and viewing variable and register values during the running of the program.

As shown in FIG. 2 and FIG. 3, the software application 200 includes at least one functional module 210 (where for brevity of the drawings, only one functional module 210 is shown in FIG. 2 and FIG. 3). The functional module 210 is a set of program elements such as data declarations and executable statements. Each functional module 210 can independently implement a certain function in the software application 200.

In some embodiments, when the software application 200 is implemented as a shopping application, the shopping application may include, for example, functional modules such as a commodity browsing module, a shopping cart management module, a message management module, and an order management module.

In some embodiment, as shown in FIG. 3, when the software application 200 is implemented as an IDE, the IDE may include, for example, a plurality of functional modules such as project management, editor management, debugging management, emulator management, flash tool, and SDK management modules. Each functional module may be further divided into smaller functional modules. For example, the project management module is configured for creation, configuration, and compilation of chip projects, and may further include functional modules such as project creation, template management, and project configuration modules; the editor management module is configured to support code editing, and may further include functional modules such as code editing, code graphics, chip graphics, peripheral graphics modules, and so on.

The functional modules of the software application 200 are generally written in a system programming language such as C/C++. The functional modules are coupled through respective interfaces and are integrated into the software application 200. To achieve a better interface display effect, reduce the development costs, and reuse network resources, a browser plug-in is integrated in the software application 200 to embed a web page module 220 in the software application 200 for front-end graphical display. Generally, the web page module 220 embedded in the software application is a dynamic HyperText Markup Language (HTML) web page including JS code.

The web page module 220 including JS code is easy to develop and convenient for user interaction, but cannot implement various complex functions alone. Therefore, in some embodiments, the web page module 220 including JS code needs to perform data interaction with some C/C++ functional modules 210, for example, transmit parameters to the functional module 210 or call the functional module 210, to implement corresponding functions.

Figure 4A:
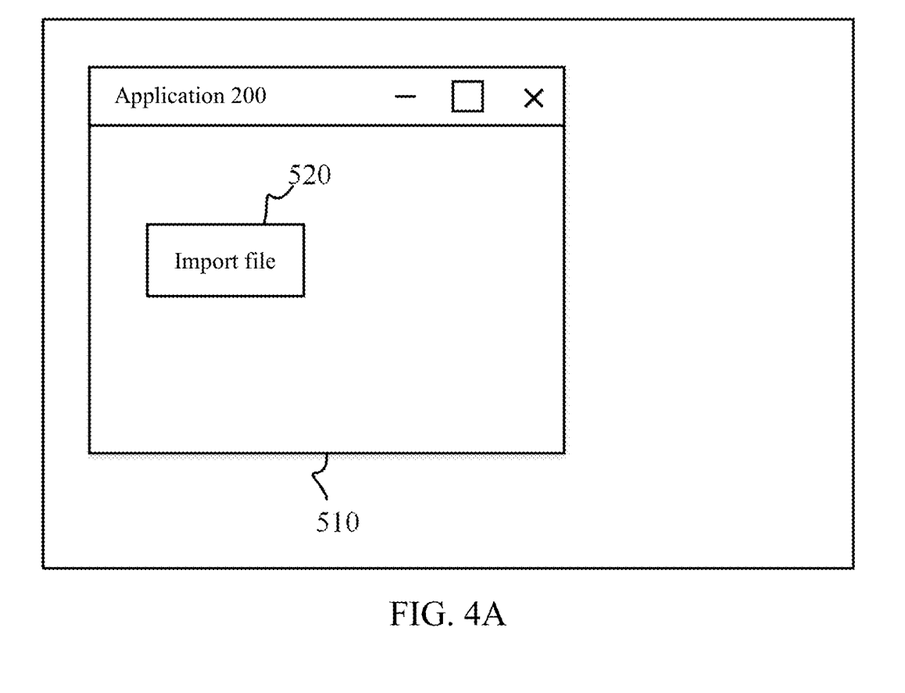
FIG. 4A and FIG. 4B are schematic diagrams illustrating a scenario of data interaction between a web page module and a functional module in a software application, in some embodiments of this application.
Figure 4B:
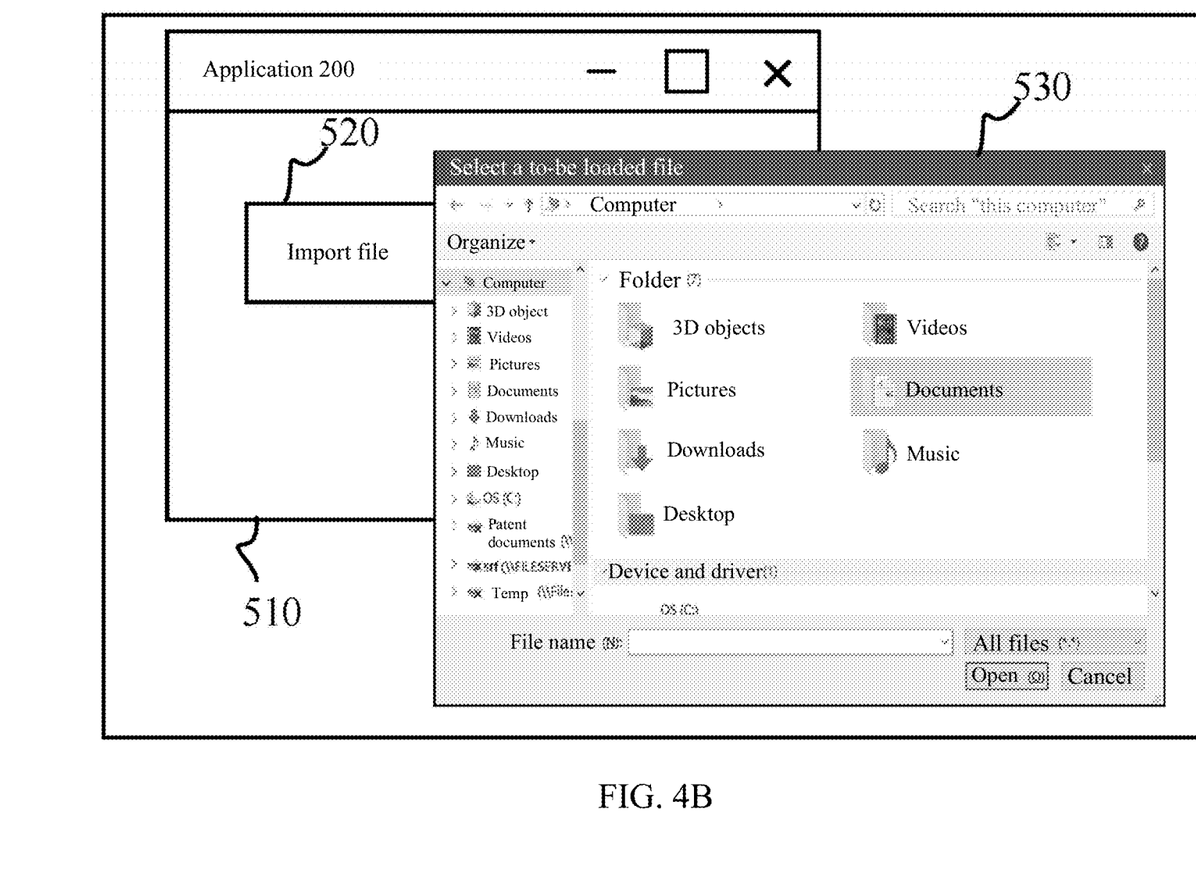

In some embodiments, the web page module of the software application 200 needs to call a file import functional module to select a target file and import the target file. For example, when the software application 200 is an IDE, the user calls the file import functional module by performing operations in the current web page module, so as to select a target executable file from a plurality of files stored in the computing device 100 and import, by using the debugger, the target executable file into the processor 410 of the embedded chip for debugging. FIG. 4A and FIG. 4B are schematic diagrams of data interaction between the web page module and the functional module.

As shown in FIG. 4A, an interface of the software application 200 is an HTML web page 510 including JS code. The web page 510 includes a button 520. When a user clicks the button 520, the JS code in the web page 510 initiates an interaction request to request to call the file import functional module of the software application to pop up a file selection dialog box. After the file import functional module is called and successfully executed, as shown in FIG. 4B, a file selection dialog box 530 pops up on the desktop. The user can select a file in the dialog box 530 and import the file. In addition, the file import functional module may return a message indicating successful execution to the web page. The web page calls a success callback function (onSuccess) based on the message. If the execution of the file import functional module fails, the functional module may return a message indicating failed execution to the web page. The web page calls a failure callback function (onFailure) based on the message.

Figure 5A:
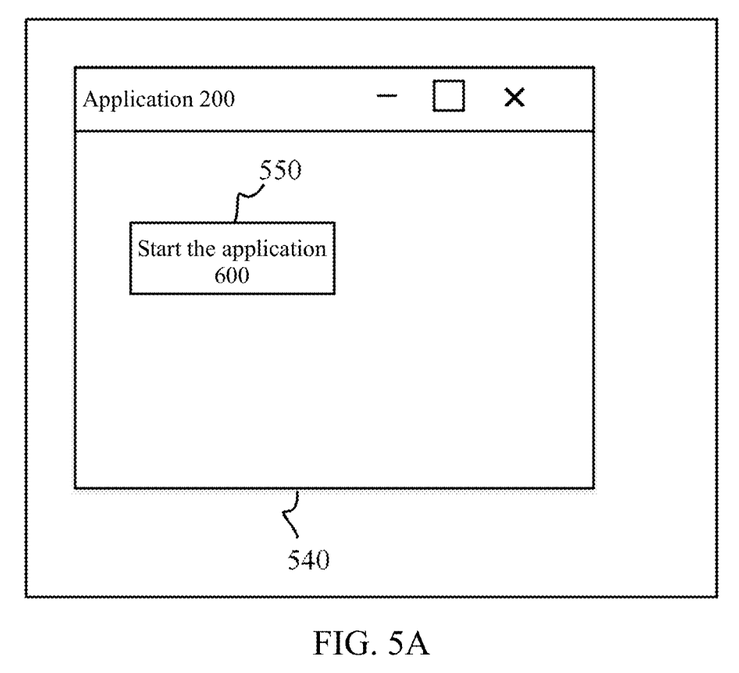
FIG. 5A and FIG. 5B are schematic diagrams illustrating a scenario of data interaction between a web page module and a functional module in a software application, according to another embodiment of this application.
Figure 5B:
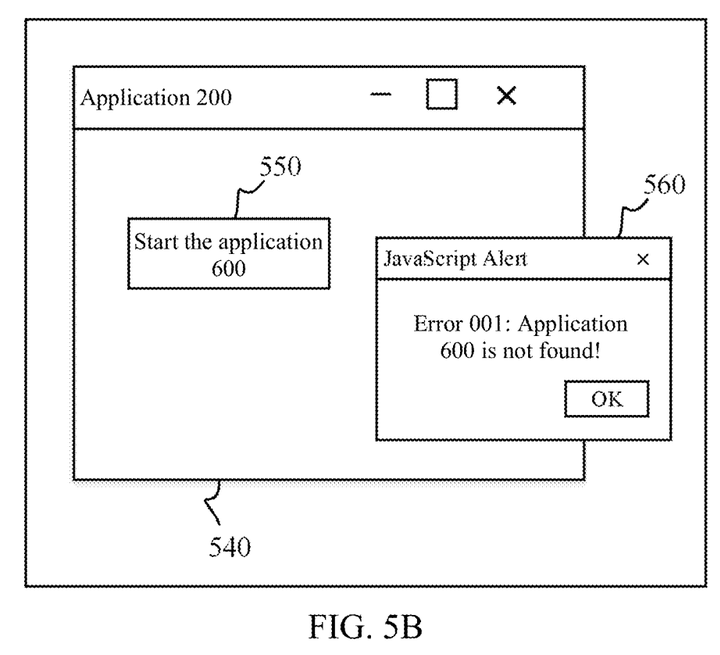

In some embodiments, the web page module of the software application 200 needs to call a command line functional module to execute a Windows CMD command to open an external software application 600. For example, when the software application 200 is an IDE, an error may occur during debugging of the processor 410 of the embedded chip. In this case, the user may call the command line functional module by performing operations in the current web page module (that is, the debugging interface of the IDE), to open an external instant messaging application, through which a problem occurring in this debugging process is sent to an experienced developer for help, or to open a particular web page of an external browser, through which a problem occurring in this debugging process is uploaded to a cloud for storage, so as to seek solutions to the problem later. FIG. 5A and FIG. 5B are schematic diagrams of data interaction between the web page module and the functional module.

As shown in FIG. 5A, a current interface of the software application 200 is an HTML web page 540 including JS code. The web page 540 includes a button 550. When a user clicks the button 550, the JS code in the web page 540 initiates an interaction request to request to call the command line functional module to execute a Windows CMD command to open an external software application 600. If the CMD command is successfully executed, the software application 600 is started, and a window of the software application 600 pops up on the desktop. The functional module may return a message indicating successful execution to the web page. The web page calls a success callback function (onSuccess) based on the message indicating successful execution returned by the functional module. If the execution of the CMD command fails, the functional module may return a message indicating failed execution to the web page. The message may include, for example, an error code (error_code) and an error message (error_message) to indicate a cause of the failure. The web page calls a failure callback function (onFailure) based on the message indicating failed execution returned by the functional module. A message dialog box (Alert) 560 pops up on the current web page 540, as shown in FIG. 5B, with an error code of 001 and an error message of "Application 600 is not found!", to prompt the user a cause of the failed execution of the functional module.

As described in the Background section, in existing technologies, the interaction between a web page module and a functional module in a software application is generally implemented by starting a local server, which leads to inefficient communication and a waste of network resources and is unfavorable to the development and maintenance of the software application. To resolve this problem, a data interaction apparatus 300 and a data interaction method 700 are described herein. The data interaction apparatus 300 resides in a software application 200, and is configured to perform the data interaction method 700 to implement efficient interaction between a web page module and a functional module in a software application.

As shown in FIG. 2, the software application 200 includes at least one functional module 210, at least one web page module 220, and a data interaction apparatus 300. The data interaction apparatus 300 is configured to receive an interaction request from the web page module 220, call the corresponding functional module 210 based on the interaction request, and feed back a calling result to the web page module 220, to implement data interaction between the web page module 220 and the functional module 210.

When the software application 200 is implemented as an IDE, as shown in FIG. 3, the IDE includes at least one functional module 210, at least one web page module 220, and a browser kernel 230. The browser kernel 230 is adapted to interpret and execute codes of the web page module 220. The browser kernel 230 includes the data interaction apparatus 300. In some embodiments, the data interaction apparatus 300 is configured to receive an interaction request from the web page module 220, call the corresponding functional module 210 based on the interaction request, and feed back a calling result to the web page module 220, to implement data interaction between the web page module 220 and the functional module 210.

Figure 6:
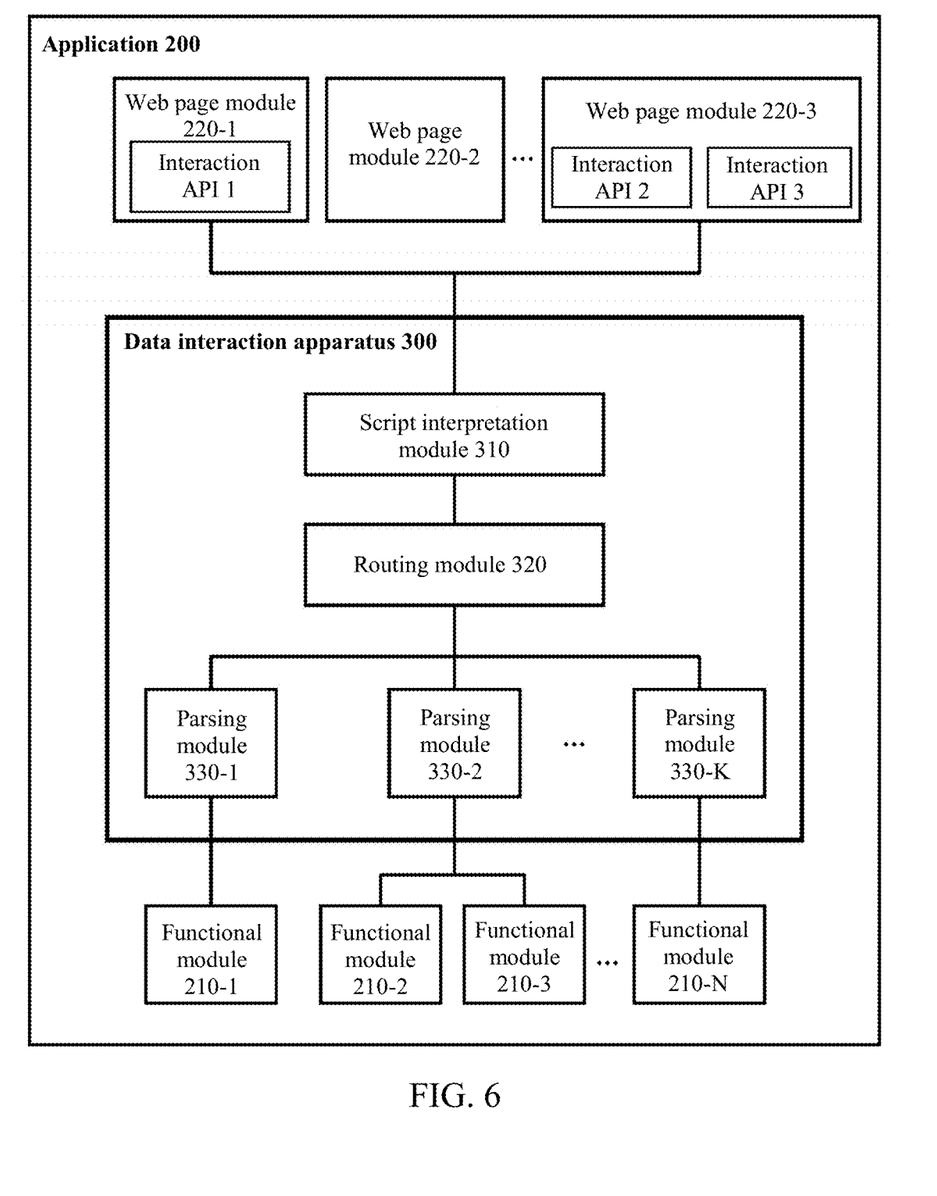
FIG. 6 is a structural diagram of a data interaction apparatus 300, in some embodiments of this application.

FIG. 6 is a structural diagram of a data interaction apparatus 300. In some embodiments of this application, as shown in FIG. 6, the data interaction apparatus 300 includes a script interpretation module 310, a routing module 320, and at least one parsing module 330-1 to 330-K. The script interpretation module 310 may be implemented as, for example, a V8HandlerImpl interpreter in the Chrome Embedded Framework (CEF), but is not limited thereto.

In some embodiments, the script interpretation module 310 is configured to receive an interaction request from a web page module 220. The interaction request is a request for data interaction with an external module of the web page module 220. The external module may be, for example, a functional module 210 in the software application 200, a web server corresponding to the web page module, or the like.

In some embodiments, the interaction request is sent by an interaction API in the web page module 220. Correspondingly, the script interpretation module 310 receives the interaction request from the interaction API in the web page module 220. When the web page module 220 includes at least one interaction API, each of the at least one interaction API can send an interaction request. The interaction requests sent by the interaction APIs may be the same or different. When the web page module 220 includes no interaction API, the web page module cannot send any interaction request.

For example, as shown in FIG. 6, a web page module 220-1 includes an interaction API 1. The interaction API 1 can send an interaction request of a certain type. A web page module 220-2 includes no interaction API, can only display static pages based on locally stored files, and cannot send any interaction request, that is, cannot interact with the external module. A web page module 220-3 includes an interaction API 2 and an interaction API 3. The interaction API 2 and the interaction API 3 both can send an interaction request to the external module. The interaction requests sent by the interaction API 2 and the interaction API 3 may be of the same type or different types.

In some embodiments, after receiving an interaction request from an interaction API in the web page module 220, the script interpretation module 310 interprets and executes the interaction request, that is, sends the interaction request to the external module with which the web page module 220 requests to interact.

In some embodiments, interaction requests are classified into a plurality of types depending on different data contents and different external modules with which the web page module 220 requests to interact. For example, the interaction requests include an HTTP request and an Asynchronous Javascript And XML (AJAX) request sent to the corresponding web server, a calling request sent to an internal functional module 210 of the software application 200, and the like. The interaction requests are generally JS requests implemented using JS scripts, but are not limited thereto.

In some embodiments, after receiving an interaction request such as an HTTP request or AJAX request sent to the web server, the script interpretation module 310 sends the interaction request to the web server, without interacting with the functional module 210 of the application. After receiving an interaction request requiring interaction with the functional module 210 of the software application, the script interpretation module 310 sends the interaction request to the routing module 320. The routing module 320 determines a parsing module 330 corresponding to the interaction request, and the parsing module 330 parses and implements the interaction request. In some embodiments, the parsing module 330 is an interface through which the web page module 220 interacts with the functional module 210, and can call, according to an identifier of a target functional module in the interaction request sent by the interaction API, the target functional module to implement a corresponding function.

For ease of description, hereinafter a request not requiring interaction with a functional module of the application is referred to as "general request," and a request requiring interaction with a functional module of the application is referred to as "extended request."

To enable the data interaction apparatus 300 to perform the data interaction method 700 of this application, the web page module 220, the routing module 320, and the parsing module 330 to interact with the functional module 210 need to be configured in advance.

In some embodiments, an interaction API configured to send an interaction request and a parsing module 330 corresponding to the interaction API are defined in the routing module 320. The parsing module 330 is configured to parse the interaction request sent by the interaction API, determine a functional module called by the interaction request, and call the functional module. The defined interaction API is then embedded in the web page module 220 that requires interaction. Based on the foregoing configuration, the interaction API sends an interaction request, And the parsing module 330 corresponding to the interaction API parses the interaction request and calls the corresponding functional module, thus implementing interaction between the web page module 220 and the corresponding functional module.

In some embodiments, there may be multiple web page modules that need to interact with a functional module, and one web page module may need to interact with multiple functional modules. Correspondingly, a corresponding relationship between multiple sets of "interaction API-parsing module" may be defined in the routing module 320.

In some embodiments, the interaction API and the parsing module 330 corresponding to the interaction API may be implemented as handler functions respectively.

In some embodiments, the interaction API may be implemented as a script (JS) function that is embedded in the web page module 220 for sending an interaction request. For example, the script function may be embedded in a <script> element of an HTML file of the web page module 120. The script function has no input parameter, but is triggered by a particular trigger event (for example, clicking of a certain button, entering of particular text in a text box, or the like) in the web page module to send (output) an interaction request to the script interpretation module 310. The interaction request includes an identifier and an input parameter of a target functional module interacting with the web page module 220 (where the input parameter is optional, and in some embodiments, the interaction request may include only the identifier of the target functional module).

In some embodiments, the parsing module 330 corresponding to the interaction API may be implemented as a C/C++ handler function. This function uses the identifier and the input parameter of the target functional module included in the interaction request as an input, and based on the identifier and the input parameter, calls the target functional module to perform corresponding processing steps, to implement a corresponding function. Further, after the execution of the target functional module is completed, the parsing module 330 may further receive an execution result (for example, indicating successful execution or failed execution) returned by the target functional module, and return (output) the execution result to the script interpretation module 310 through the routing module 320.

To more clearly describe how the foregoing embodiments are implemented, a specific embodiment is used here to describe the script function-parsing module. Those skilled in the art may understand that the following function names, use cases, and codes are all for illustrative purposes, and should not be construed as limiting the scope of the embodiments.

For example, in an example, a cdkQuery function is defined in the routing module 320. This function serves as a method for a web page JS window object, that is, window.cdkQuery, and is used for sending an interaction request. In addition, a parsing module cdkQueryImp is defined. This parsing module is a handler function written in C/C++, and is configured to parse the interaction request sent by the cdkQuery function, determine a functional module called by the interaction request, and call the functional module. The window.cdkQuery function is added to HTML code of the web page module requiring interaction, as shown below:

```
window.cdkQuery({
    request: JSON.stringify({method: "IDEFunction"}),
    onSuccess: function (response){ },
    onFailure: function (error_code, error_message) { }
});
```

When the window.cdkQuery function in the web page is called, an interaction request is generated. In some embodiments, the interaction request is an asynchronous JS request including three fields: request, onSuccess, and onFailure.

The request field includes request content, in which the "method" field includes an identifier of a functional module with which the web page module requests to interact. Different functional modules in the software application may be correspondingly called by setting the "method" field to different functional module identifiers. The onSuccess field is a success callback function. When the functional module is called and successfully executed, the success callback function is called. The onFailure is a failure callback function. When the calling or execution of the functional module fails, the failure callback function is called.

Based on the defined interaction API, parsing module, and corresponding relationship between the interaction API and the parsing module and by adding the defined interaction API to the HTML code of the web page module requiring interaction, the data interaction apparatus 300 can perform the data interaction method 700, to implement data interaction between the web page module and the functional module in the software application.

After a target interaction API in the web page module sends an interaction request, the script interpretation module 310 receives the interaction request from the target interaction API. The interaction request includes an identifier of the target functional module with which the web page module requests to interact. In some embodiments, the target interaction API here refers in particular to an interaction API that sends an interaction request in the web page. In some embodiments, the interaction request further includes an input parameter of the target functional module.

In some embodiments, the target interaction API may be a script function embedded in the web page module. For example, the HTML code of the web page module 220-1 shown in FIG. 6 includes the window.cdkQuery function described above. When the function is called, an interaction request is generated. The interaction request includes an identifier of the functional module 210-1, that is, the interaction request requests to call the functional module 210-1. The window.cdkQuery function is the target interaction API. Correspondingly, the script interpretation module 310 receives the interaction request.

In some embodiments, the web page module is adapted to receive a trigger event. The target interaction API sends an interaction request when the web page module receives a target trigger event. That is, when the target trigger event occurs in the web page module, calling of the target interaction API is triggered to send the interaction request. The target trigger event may be, for example, clicking of a button, entering of specified text in a text box, or the like, but is not limited thereto. For example, referring to FIG. 4A, the target trigger event may be a user clicking the button 520.

To more clearly describe the function of triggering the target interaction API through a target trigger event to send an interaction request, a code example of a target trigger event is provided below. Those skilled in the art may understand that the following code is only for illustrative purposes and should not be construed as limiting the scope of the embodiments.

The following shows an example of HTML code of the web page module in which clicking an "Import file" button 520 shown in FIG. 4A is set as a target trigger event:

```
<script type="text/javascript">
    function doQuery( ) {
        window.cdkQuery({
            request: JSON.stringify({method: "IDEFunction"}),
            onSuccess: function (response){ },
            onFailure: function (error_code, error_message) { }
        });
</script>
Query String: <input type="button" value="Import file" onclick=
"doQuery( )"/>
```

When a user clicks the button 520 in the web page, execution of the doQuery function is triggered, which calls the target interaction API window.cdkQuery to generate an interaction request.

In some embodiments, after receiving the interaction request sent by the target interaction API, the script interpretation module 310 determines whether the interaction request is a general request. The general request is a request not requiring data interaction with a functional module of the application, such as an HTTP request or an AJAX request. If the interaction request is a general request, the interaction request can be directly parsed by the script interpretation module 310, and does not need to be parsed by the parsing module 330. If the interaction request is not a general request, the script interpretation module 310 sends the interaction request to the routing module 320. The routing module 320 determines a target parsing module corresponding to the target interaction API, and then the target parsing module parses and executes the interaction request.

In some embodiments, the script interpretation module 310 may determine whether the interaction request is a general request by determining whether a component name of the target interaction API belongs to a set of general component names. A general component is an interaction API that can be parsed and implemented by the script interpretation module 310 by default, and does not need to be additionally defined. General components include, for example, methods of an httpRequest object, methods of an xmlHttpRequest object, and the like. If the component name of the target interaction API belongs to the set of general component names, the interaction request is a general request. If the component name of the target interaction API does not belong to the set of general component names, the interaction request is not a general request but a custom extended request, i.e., a request for implementing data interaction between a web page module and a functional module in this application. In this case, the interaction request is sent to the routing module 320, for the routing module 320 to determine a target parsing module 330 for parsing the interaction request.

The routing module 320 determines, according to a preset corresponding relationship between interaction APIs and parsing modules, a target parsing module corresponding to the target interaction API from the at least one parsing module 330. For example, as shown in FIG. 6, the routing module 320 determines the target parsing module as the parsing module 330-K.

After determining the target parsing module, the routing module 320 sends the identifier of the target functional module to the target parsing module, for the target parsing module to parse the identifier and call the target functional module to implement a corresponding function.

For example, referring to the foregoing code example of the window.cdkQuery function, the interaction request generated by the window.cdkQuery function includes three fields: request, onSuccess, and onFailure. The request field is a JSON byte stream including an identifier of a to-be-called functional module. The routing module 320 sends the JSON byte stream of the request field in the interaction request to the target parsing module 330-K. The target parsing module 330-K parses out an identifier of a target functional module from the JSON byte stream, where the identifier of the target functional module is, for example, 210-N. Correspondingly, the target parsing module 330-K calls the functional module 210-N to implement a corresponding function. In other words, the content of the request field in the interaction request is an input parameter of the target parsing module 330-K. The target parsing module 330-K processes the input parameter according to preset processing logic, and the result of the processing is to call the target functional module involved in the request field.

In some embodiments, after calling the corresponding target functional module, the target parsing module is further adapted to receive an execution result returned by the target functional module, and return the execution result to the routing module 320, for the routing module 320 to return the execution result to the script interpretation module 310.

In some embodiments, the interaction request further includes a success callback function and a failure callback function. The script interpretation module 310 is further adapted to: call the success callback function when the execution result is successful; and call the failure callback function when the execution result is failed.

For example, referring to the foregoing code example of the window.cdkQuery function, the interaction request generated by the window.cdkQuery function includes three fields: request, onSuccess, and onFailure. The onSuccess field may include a success callback function, i.e., function (response). The onFailure field may include a failure callback function, i.e., function (error_code, error_message). When the execution of the target functional module is successful, the script interpretation module 310 interprets and executes the success callback function. When the execution of the target functional module fails, the script interpretation module 310 interprets and executes the failure callback function.

The success callback function and the failure callback function may be set by those skilled in the art, and are not limited in this application. For example, referring to FIG. 4B and FIG. 5B, the success callback function may be set to null, and the failure callback function may be set to pop up a message dialog box on the web page and to prompt an error code (error_code) and an error message (error_message) in the message dialog box.

Figure 7:
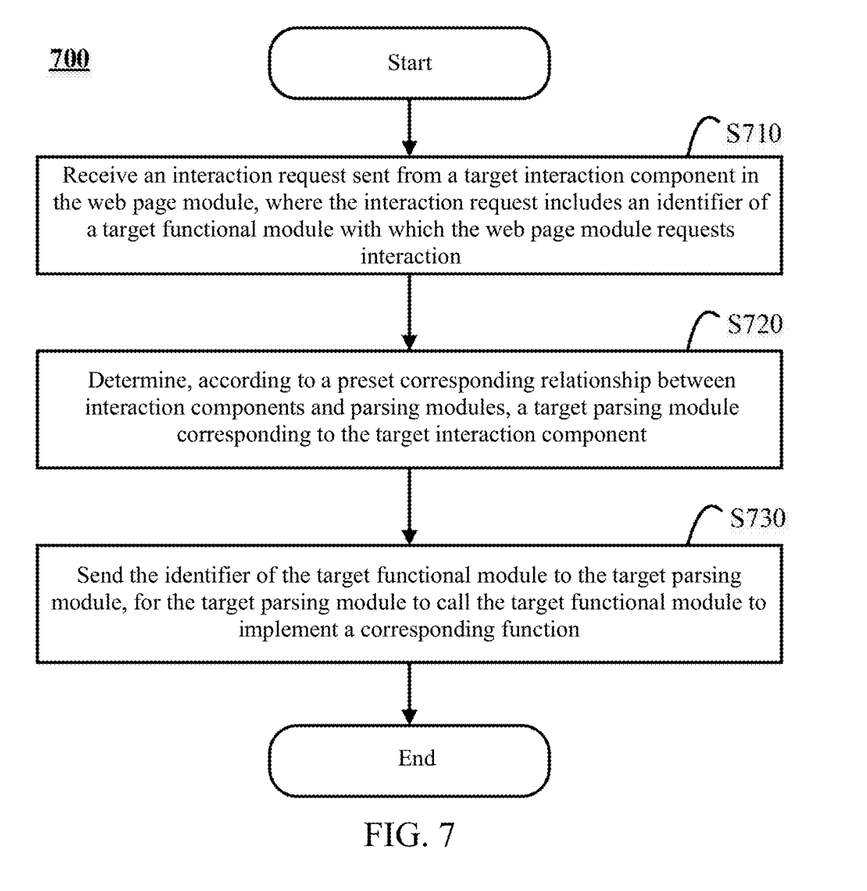
FIG. 7 is a flowchart of a data interaction method 700, in some embodiments of this application.

FIG. 7 is a flowchart of a data interaction method 700, in some embodiments of this application. The method 700 is performed in the data interaction apparatus 300 described above.

In step S710, an interaction request from a target interaction API in the web page module is received. The interaction request includes an identifier of a target functional module with which the web page module requests to interact. In some embodiments, step S710 is performed by the script interpretation module 310 of the data interaction apparatus 300.

In some embodiments, the interaction API may be a script function in the web page module. By taking the foregoing window.cdkQuery function embedded in the web page module 220-1 as an example, an interaction request sent by the window.cdkQuery function is, for example, as follows:

```
window.cdkQuery({
    request: JSON.stringify({method: "IDEFunction"}),
    onSuccess: function (response){ },
    onFailure: function (error_code, error_message) { }
});
```

The interaction request includes three fields: request, onSuccess, and onFailure. The request field is request content, in which the "method" field includes an identifier of a target functional module with which the web page module 220-1 requests to interact. Different functional modules in the application may be correspondingly called by setting the "method" field to different functional module identifiers. The onSuccess field is a success callback function. When the functional module is called and successfully executed, the success callback function is called. The onFailure is a failure callback function. When the calling or execution of the functional module fails, the failure callback function is called.

In some embodiments, the web page module is adapted to receive a trigger event. The target interaction API sends an interaction request when the web page module receives a target trigger event. That is, when the target trigger event occurs in the web page module, calling of the target interaction API is triggered to send an interaction request. The target trigger event may be, for example, clicking of a button, entering of specified text in a text box, or the like, but is not limited thereto. For example, referring to FIG. 4A, the target trigger event may be a user clicking the button 520. The following shows an example of HTML code of the web page module in which clicking of the button 520 is set as a trigger event:

```
<script type="text/javascript">
function doQuery( ) {
    window.cdkQuery({
        request: JSON.stringify({method: "IDEFunction"}),
        onSuccess: function (response){ },
        onFailure: function (error_code, error_message) { }
    });
}
</script>
Query String: <input type="button" value="import file" onclick="doQuery( )"/>
```

When a user clicks the button 520 in the web page, execution of the doQuery function is triggered, so as to call the target interaction API window.cdkQuery to generate an interaction request.

In some embodiments, there are two types of interaction request: a general request and an extended request. The general request is a request not requiring interaction with a functional module of the application, which can be directly parsed by the script interpretation module 310 in the data interaction apparatus 300, and does not need to be parsed by the parsing module 330. The extended request is a request requiring interaction with a functional module of the application, and needs to be parsed by the parsing module 330 in the data interaction apparatus 300.

In some embodiments, after the interaction request sent by the target interaction API is received in step S710, step S715 may be performed. Step S715 is performed by the script interpretation module 310. In step S715, whether the interaction request is a general request is determined. If the interaction request is not a general request, a subsequent step S720 is performed; if the interaction request is a general request, the interaction request is directly parsed by the script interpretation module 310.

In some embodiments, whether the interaction request is a general request may be determined by determining whether a component name of the target interaction API belongs to a set of general component names. A general component is an interaction API that can be parsed and implemented by the script interpretation module 310 by default, and does not need to be additionally defined. General components include, for example, methods of an httpRequest object, methods of an xmlHttpRequest object, and the like. If the component name of the target interaction API belongs to the set of general component names, the interaction request is a general request and is directly parsed by the script interpretation module 310. If the component name of the target interaction API does not belong to the set of general component names, the interaction request is not a general request but a custom extended request, i.e., a request for implementing data interaction between a web page module and a functional module in this application. In this case, a subsequent step S720 is performed.

In step S720, a target parsing module corresponding to the target interaction API is determined according to a preset corresponding relationship between interaction APIs and parsing modules.

In some embodiments, step S720 is performed by the routing module 320 of the data interaction apparatus 300. The routing module 320 determines, according to the preset corresponding relationship between interaction APIs and parsing modules, a target parsing module 330 corresponding to the target interaction API sending the interaction request. For example, as shown in FIG. 6, the routing module 320 determines the target parsing module as the parsing module 330-K.

After the target parsing module is determined, a subsequent step S730 may be performed. In step S730, the identifier of the target functional module is sent to the target parsing module, for the target parsing module to call the target functional module to implement a corresponding function.

For example, referring to the foregoing code example of the window.cdkQuery function, the interaction request generated by the window.cdkQuery function includes three fields: request, onSuccess, and onFailure. The request field may include a JSON byte stream including an identifier of a to-be-called functional module. The routing module 320 sends the JSON byte stream of the request field in the interaction request, as the input parameter of the target parsing module 330-K, to the target parsing module 330-K. The target parsing module 330-K parses out an identifier of a target functional module from the JSON byte stream, where the identifier of the target functional module is, for example, 210-N. Correspondingly, the target parsing module 330-K calls the functional module 210-N to implement a corresponding function.

In some embodiments, after the target functional module is called in step S730, step S740 may be further performed. In some embodiments, step S740 is performed by the target parsing module of the data interaction apparatus 300. In step S740, the target parsing module receives an execution result returned by the target functional module, and returns the execution result to the routing module 320, for the routing module 320 to return the execution result to the script interpretation module 310.

In some embodiments, the interaction request further includes a success callback function and a failure callback function. After step S740, step S750 may be performed. In some embodiments, step S750 is performed by the script interpretation module 310. In step S750, when the execution result is successful, the success callback function is called; and when the execution result is failed, the failure callback function is called.

For example, referring to the foregoing code example of the window.cdkQuery function, the interaction request generated by the window.cdkQuery function includes three fields: request, onSuccess, and onFailure. The onSuccess field may include a success callback function, i.e., function (response). The onFailure field may include a failure callback function, i.e., function (error_code, error_message). When the execution of the target functional module is successful, the script interpretation module 310 interprets and executes the success callback function. When the execution of the target functional module fails, the script interpretation module 310 interprets and executes the failure callback function.

The success callback function and the failure callback function may be set by those skilled in the art, and are not limited in this application. For example, referring to FIG. 4B and FIG. 5B, the success callback function may be set to null, and the failure callback function may be set to pop up a message dialog box on the web page and to prompt an error code (error_code) and an error message (error_message) in the message dialog box.

The various technologies described here can be implemented using hardware, software, or a combination thereof. Therefore, the method and device of this application or some aspects or parts of the method and device of this application may take the form of program code (i.e., instructions) embedded in a tangible medium, such as a removable hard disk, a USB flash drive, a floppy disk, or any other machine-readable storage medium. When the program is loaded into a machine such as a computer and is executed by the machine, the machine becomes a device for practicing this application.

In a case where the program code is executed on a computing device, the computing device generally includes a processor, a processor-readable storage medium (including volatile and non-volatile memories and/or storage elements), at least one input apparatus, and at least one output apparatus. The memory is configured to store program code. The processor is configured to perform the data interaction method of this application according to instructions in the program code stored in the memory.

By way of example and not limitation, readable media includes readable storage media and communication media. The readable storage media stores information such as computer-readable instructions, data structures, program modules, or other data. The communication media typically embodies computer-readable instructions, data structures, program modules, or other data in a modulated data signal such as a carrier wave or other transport mechanism, and includes any information delivery media. Any combination of the above also falls within the scope of readable media.

In the embodiments provided herein, algorithms and displays are not inherently relevant to any particular computer, virtual system, or other devices. Various general-purpose systems can also be used in conjunction with the examples of this application. This application is not specific to any particular programming language. In some embodiments, the content of this application described herein may be implemented in various programming languages, and that the above description about particular languages is for the purpose of disclosing a preferred implementation of this application.

Many specific details are described in the specification provided herein. However, the embodiments of this application can be practiced without these specific details. In some examples, well-known methods, structures, and technologies are not shown in detail so as not to obscure the understanding of this specification.

Similarly, for the brevity of this application and to facilitate the understanding of one or more of the various aspects of this application, in the above description of the exemplary embodiments of this application, the various features of this application are sometimes combined in a single embodiment, drawing, or description thereof. However, the disclosed method should not be interpreted as reflecting an intention that this application as claimed requires more features than those explicitly set forth in each claim. To be specific, as reflected in the following claims, the inventive aspect lies in having fewer features than all the features of the single embodiment disclosed above. Therefore, the claims complying with a specific implementation are explicitly incorporated into the specific implementation, in which each claim is considered as a separate embodiment of this application.

Those skilled in the art should understand that modules or units or components of a device in an example disclosed herein can be arranged in the device described in this example, or can alternatively be positioned in one or more devices different from the device in this example. Modules in the above example can be combined into one module or can be divided into a plurality of sub-modules.

Those skilled in the art may understand that modules in a device of an embodiment may be adaptively changed and disposed in one or more devices different from this embodiment. Modules or units or components in the embodiment can be combined into one module or unit or component, and can also be divided into a plurality of sub-modules or sub-units or sub-components. Except that at least some of such features and/or processes or units are mutually exclusive, all the features disclosed in this specification (including the appended claims, abstract, and accompanying drawings) and all the processes or units of any method or device so disclosed may be combined in any combination. Unless otherwise expressly stated, each feature disclosed in this specification (including the appended claims, abstract, and accompanying drawings) may be replaced by an alternative feature serving the same, equivalent or similar purpose.

Moreover, those skilled in the art can understand that although some embodiments described herein include some features included in other embodiments but not other features, it is intended that combinations of features of different embodiments fall within the scope of this application and form different embodiments. For example, in the following claims, any of the embodiments claimed can be used in any combination.

Furthermore, some of the embodiments are described herein as combinations of methods or method elements that can be implemented by a processor of a computer system or by other apparatuses performing the functions. Therefore, a processor with necessary instructions for implementing the methods or method elements forms an apparatus for implementing the methods or method elements. In addition, the elements of the apparatus embodiment described herein are an example of the following apparatus: the apparatus is configured to implement a function executed by an element to achieve the objective of this application.

As used herein, unless otherwise specified, the use of ordinal words such as "first," "second," and "third" to describe ordinary objects merely represents different instances involving similar objects, and is not intended to imply that the objects so described must in a given order in time, space, sorting aspects, or in any other way.

Although this application is described according to a limited number of embodiments, those skilled in the art, benefiting from the foregoing description, should understand that other embodiments may be figured out within the scope of this application thus described. In addition, it should be noted that the language used in this specification is chosen primarily for readability and teaching purposes and not for the purpose of explaining or defining the subject matter of this application. Therefore, without departing from the scope and spirit of the appended claims, many modifications and changes are obvious to those of ordinary skill in the art. For the scope of this application, the disclosure of this application is illustrative and not limiting, and the scope of this application is subject to the appended claims.

What is claimed is:

1. A data interaction method, for implementing data interaction in a software application between a web page module and a functional module, wherein the web page module comprises at least one interaction Application Programming Interface (API), the method comprising:
   defining, by a browser kernel of the software application, one or more customized functions with corresponding function identifiers;
   adding, by the browser kernel of the software application, a function identifier of a customized function in HyperText Markup Language (HTML) code of the web page module, wherein the HTML code of the web page module comprises:
      a scrip defining an interaction API corresponding to a button of the software application, the interaction API being triggered when the button is clicked, wherein the interaction API comprises a field specifying the function identifier of the customized function as a parameter;
   receiving, by the browser kernel of the software application, a click event on the button of the software application for making an interaction request;
   determining, by the browser kernel of the software application, whether a component name of the interaction API belongs to a set of general component names;
   in response to that the component name of the interaction API belongs to the set of general component names, directly parsing the interaction request;
   in response to that no component name of the interaction API belongs to the set of general component names:
      routing, by the browser kernel of the software application according to a preset corresponding relationship between the one or more customized functions and parsing modules of the software application, the function identifier to a target parsing module of the software application; and
      calling the customized function corresponding to the function identifier to implement a corresponding function.

2. The method according to claim 1, wherein the web page module is configured to receive a trigger event when the button is clicked, and the trigger event triggers the interaction API.

3. The method according to claim 1, wherein after implementing the corresponding function, the method further comprises:
   receiving an execution result of the customized function.

4. The method according to claim 3, wherein the interaction API further comprises a success callback function and a failure callback function, and after receiving the execution result, the method further comprises:
   calling the success callback function if the execution result is successful; and
   calling the failure callback function if the execution result is failed.

5. The method according to claim 1, wherein the interaction API is written in JavaScript (JS), and the one or more customized functions are written in C/C++.

6. The method according to claim 1, wherein the software application comprises an integrated development environment (IDE).

7. A system comprising one or more processors and one or more non-transitory computer-readable memories coupled to the one or more processors, the one or more non-transitory computer-readable memories storing instructions that, when executed by the one or more processors, cause the system to trigger a software application that performs operations comprising:
   defining, by a browser kernel of the software application, one or more customized functions with corresponding function identifiers;
   adding, by the browser kernel of the software application, a function identifier of a customized function in HyperText Markup Language (HTML) code of a web page module of the software application, wherein the HTML code of the web page module comprises:
      a scrip defining an interaction API corresponding to a button of the software application, the interaction API being triggered when the button is clicked, wherein the interaction API comprises a field specifying the function identifier of the customized function as a parameter;

receiving, by the browser kernel of the software application, a click event on the button of the software application for making an interaction request;

determining, by the browser kernel of the software application, whether a component name of the interaction API belongs to a set of general component names;

in response to that the component name of the interaction API belongs to the set of general component names, directly parsing the interaction request;

in response to that no component name of the interaction API belongs to the set of general component names:

routing, by the browser kernel of the software application according to a preset corresponding relationship between the one or more customized functions and parsing modules of the software application, the function identifier to a target parsing module of the software application; and calling the customized function corresponding to the function identifier to implement a corresponding function.

8. The system of claim 7, wherein the web page module is configured to receive a trigger event when the button is clicked, and the trigger event triggers the interaction API.

9. The system of claim 7, wherein the interaction API is written in JavaScript (JS), and the one or more customized functions are written in C/C++, and the software application comprises an integrated development environment (IDE).

10. A non-transitory computer-readable storage medium storing instructions that, when executed by one or more processors, cause the one or more processors to trigger a software application that performs operations comprising:

defining, by a browser kernel of the software application, one or more customized functions with corresponding function identifiers;

adding, by the browser kernel of the software application, a function identifier of a customized function in Hyper-Text Markup Language (HTML) code of a web page module of the software application, wherein the HTML code of the web page module comprises:

a scrip defining an interaction API corresponding to a button of the software application, the interaction API being triggered when the button is clicked, wherein the interaction API comprises a field specifying the function identifier of the customized function as a parameter;

receiving, by the browser kernel of the software application, a click event on the button of the software application for making an interaction request;

determining, by the browser kernel of the software application, whether a component name of the interaction API belongs to a set of general component names;

in response to that the component name of the interaction API belongs to the set of general component names, directly parsing the interaction request;

in response to that no component name of the interaction API belongs to the set of general component names:

routing, by the browser kernel of the software application according to a preset corresponding relationship between the one or more customized functions and parsing modules of the software application, the function identifier to a target parsing module of the software application; and calling the customized function corresponding to the function identifier to implement a corresponding function.

11. The non-transitory computer-readable storage medium of claim 10, wherein the interaction API is written in JavaScript (JS), and the one or more customized functions are written in C/C++, and the software application comprises an integrated development environment (IDE).

* * * * *